US011566968B2

(12) United States Patent
Holdmeyer et al.

(10) Patent No.: US 11,566,968 B2
(45) Date of Patent: Jan. 31, 2023

(54) CONTROL OF PARTICLE DELIVERY IN CONTAMINATION TEST RIG

(71) Applicant: Rolls-Royce Corporation, Indianapolis, IN (US)

(72) Inventors: Emily Holdmeyer, Indianapolis, IN (US); Bruce Crook, Mooresville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 199 days.

(21) Appl. No.: 17/152,436

(22) Filed: Jan. 19, 2021

(65) Prior Publication Data

US 2022/0228950 A1 Jul. 21, 2022

(51) Int. Cl.

| | |
|---|---|
| ***G01M 15/02*** | (2006.01) |
| ***G01M 13/003*** | (2019.01) |
| ***G06F 17/17*** | (2006.01) |
| ***G05D 7/06*** | (2006.01) |
| ***G05D 13/62*** | (2006.01) |
| ***G05B 13/02*** | (2006.01) |
| ***G06F 17/11*** | (2006.01) |

(Continued)

(52) U.S. Cl.

CPC ............. *G01M 15/02* (2013.01); *G01G 11/00* (2013.01); *G01M 13/003* (2019.01); *G05B 13/0245* (2013.01); *G05D 7/0605* (2013.01); *G05D 13/62* (2013.01); *G06F 17/11* (2013.01); *G06F 17/17* (2013.01); *G01N 2015/0019* (2013.01)

(58) Field of Classification Search

CPC ................ G01M 15/02; G01M 13/003; G05B 13/0245; G05D 7/0605; G05D 13/62; G06F 17/11; G06F 17/17; G01N 2015/0019; G01G 11/12; G01G 11/00; G01G 13/06; G01G 13/00

See application file for complete search history.

(56) References Cited

U.S. PATENT DOCUMENTS 4,188,970 A * 2/1980 Maidment ............... B01F 25/30 251/145
4,893,262 A * 1/1990 Kalata .................. G05B 13/048 702/179

(Continued)

FOREIGN PATENT DOCUMENTS

CH 632718 * 10/1982 ............. G01G 13/20

*Primary Examiner* — Rocio Del Mar Perez-Velez
*Assistant Examiner* — Olvin Lopez Alvarez
(74) *Attorney, Agent, or Firm* — Crowell & Moring LLP

(57) ABSTRACT

Systems and methods for control of the delivery of contaminates are provided. A conveyor moves contaminate particles from a hopper into an airflow. The contents of a hopper at multiple time points within a sliding window of time are weighted with a scale. A processor applies linear regression to a data set comprising the time points as an independent variable and the weight measurements as a dependent variable, resulting in a determination of a line fitting the data set. A processor determines a current mass flow rate of the contaminate particles from the slope of the line. The processor determines an estimated change in the conveyor motor speed needed to achieve the target mass flow rate, the estimated change determined from a predetermined mapping of flow rates to motor speeds, the estimated change based on the current mass flow rate, the target mass flow rate, and a predetermined fraction.

20 Claims, 9 Drawing Sheets

(51) Int. Cl.
*G01G 11/00* (2006.01)
*G01N 15/00* (2006.01)

(56) References Cited

U.S. PATENT DOCUMENTS

| | | | | |
|---|---|---|---|---|
| 8,006,544 | B2 | 8/2011 | Holmes et al. | |
| 10,207,878 | B1 * | 2/2019 | Johnson | B65G 53/66 |
| 2011/0174552 | A1 * | 7/2011 | Ahmed | G01G 11/003 177/1 |
| 2018/0264490 | A1 * | 9/2018 | Fushimi | B05B 12/008 |
| 2020/0399754 | A1 * | 12/2020 | Novozhilov | B01D 3/346 |
| 2022/0049987 | A1 * | 2/2022 | Leelayoova | G01F 25/14 |

* cited by examiner

CONTROL OF PARTICLE DELIVERY IN CONTAMINATION TEST RIG

CROSS-REFERENCE TO RELATED APPLICATIONS

U.S. non-provisional application Ser. No. 17/012,416 filed Sep. 4, 2020 and entitled "CONTAMINATION TEST RIG" describes novel contamination test rigs and novel operations thereof. The entire contents of the above-identified application is hereby incorporated by reference.

TECHNICAL FIELD

This disclosure relates to contamination testing and, in particular, to control of particle delivery in contamination testing.

BACKGROUND

Present systems for delivering contaminate particles into air flows suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Systems and methods for control of the delivery of contaminates are provided. For example, a motor, which drives a conveyor, may rotate at a motor speed corresponding to a target mass flow rate, where the conveyor moves contaminate particles from a hopper into an airflow in, for example a mix line of a contamination test rig. The contents of the hopper may be weighed at multiple time points within a sliding window of time by taking weight measurements with a scale. The hopper may, for example, rest on the scale. Linear regression may be applied to a data set comprising the time points as an independent variable and the weight measurements as a dependent variable, resulting in a determination of a line fitting the data set. A current mass flow rate of the contaminate particles may be determined from the slope of the line fitting the data set.

An estimated change in the motor speed needed to achieve the target mass flow rate may be determined. The estimated change may be determined from a predetermined mapping of flow rates to motor speeds based on the current mass flow rate and the target mass flow rate, where the estimated change is determined to be a fraction of a motor speed adjustment that the predetermined mapping of flow rates to motor speeds indicates from only the current mass flow rate and the target mass flow rate. An estimated change in the motor speed may be made.

One interesting feature of the systems and methods described below may be that the delivery rate of contaminates may be more accurately and/or precisely controlled than with other systems and methods for controlling delivery of contaminates. Indeed, the increased accuracy is even achieved at high pressure and/or in high temperature environments.

Figure 1:
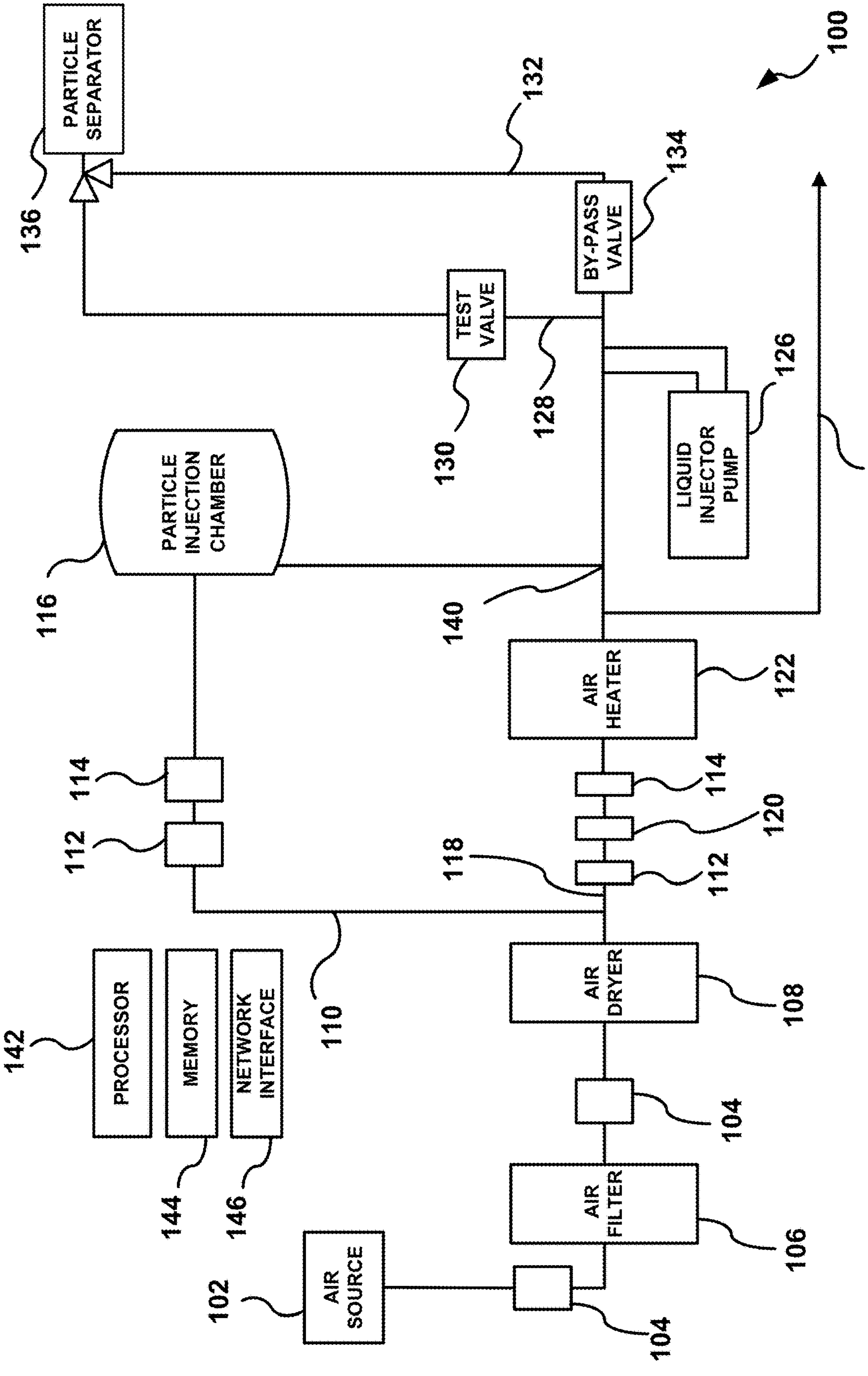
FIG. 1 is a schematic diagram of an example contamination test rig.

FIG. 1 is a schematic diagram of an example of a contamination test rig 100. The contamination test rig 100 illustrated in FIG. 1 includes an air source 102, regulation devices 104, an air filter 106, an air dryer 108, a mix line 110, one or more flow regulators 112, one or more air flow meters 114, a particle injection chamber 116, a heated line 118, a relief valve 120, an air heater 122, a bleed line 124, a liquid injector pump 126, a valve line 128, a test valve 130, a by-pass line 132, a by-pass valve 134, a particle separator 136, and a junction 140.

The contamination test rig 100 may be a valve contamination test rig 100, wherein the contamination test rig 100 may be used for contaminate testing of a valve, such as the test valve 130. The contamination test rig 100 may be a dry contamination test rig 100, wherein the contaminate used in the contamination test rig is a mixture of dry contaminate particles as opposed to a wet slurry. The contamination test rig 100 may be able to run unattended. The components of the contamination test rig 100 are described below generally in order of the air flow through the contamination test rig 100.

The air source 102 may be any source of air capable of delivering air, for example, an air compressor. The air source 102 may supply high pressure air, for example, the air source 102 may supply air that is pressurized to 350 psig. In other examples, the air source 102 may supply air at any suitable pressure.

One or more air flow regulation devices 104 may be downstream of the air source 102. The regulation devices 104 may include any components capable of controlling and/or regulating the air supplied by the air source 102. The regulation devices may include, for example, a manual valve, a flow meter, a control valve, a solenoid valve, and/or a relief valve. The regulation devices may be controlled by a processor 142. The processor 142 may control the regulation devices 104 based on a target temperature, pressure, and/or flow rate of the contamination test rig 100. The target temperature, pressure, and/or flow rate may be, for example, a target operating condition at the inlet of the test valve 130.

For example, a temperature sensor at the test valve 130 may communicate with the processor 142. If the temperature at the test valve 130 is below the target operating condition of the test valve 130, the processor may increase the flow of air through the heated line 118 by adjusting the air regulator 112 of the heated line 118, decrease the flow of air through the mix line 110 by adjusting the air regulator 112 of the mix line 110, and/or by increasing the temperature of the air heater 122. Alternatively or additionally, if the temperature at the test valve 130 is above the target operating condition of the test valve 130, the processor may decrease the flow of air through the heated line 118 by adjusting the air regulator 112 of the heated line 118, increase the flow of air through the mix line 110 by adjusting the air regulator 112 of the mix line 110, and/or by decreasing the temperature of the air heater 122.

The air filter 106 may be downstream of the air source 102 and/or one or more of the regulation devices 104. Alternatively or additionally, the air filter 106 may be upstream of one or more of the regulation devices 104. The air filter 106 may be the main air filter 106 of the contamination test rig 100. The air filter 106 may remove debris and contaminate from the air supplied by the air source 102.

The air dryer 108 may be downstream of the air filter 106 and/or one or more of the regulation devices 104. The air dryer 108 may be any dryer capable of drying the air supplied by the air source 102, for example, a refrigerated air dryer. The air dryer 108 may dry the air supplied by the air source 102 in order to keep the humidity levels of the supplied air constant regardless of ambient conditions. The air dryer 108 may dry the air to a specific humidity level based on target operating conditions of the contamination test rig 100.

The mix line 110 and the heated line 118 are disposed downstream of the air dryer 108. Downstream of the air dryer 108, the flow of air supplied by the air source 102 may be split between the mix line 110 and the heated line 118. The mix line 110 may include one of the flow regulators 112, one of the air flow meters 114, and the particle injection chamber 116.

The flow regulator 112 may be any type of valve capable of regulating a flow of air 226 flowing through the mix line 110, for example a high pressure air regulator and/or an electronically controlled high pressure flow regulator, such as a valve sold under the mark of PROPORTION-AIR owned by Proportion-Air, Inc. The flow regulator 112 may control an amount of air flowing through the mix line 110. The air flow meter 114 may be downstream of the flow regulator 112, and may be any flow meter capable of measuring the flow of air 226 through the mix line 110. The air flow meter 114 may be, for example, an ASME (American Society of Mechanical Engineers) orifice plate mass flow meter.

The particle injection chamber 116 may be downstream of the flow regulator 112 and or the air flow meter 112. The particle injection chamber 116 may be or include a pressure chamber. As explained further below, the inside of the particle injection chamber 116 may be at substantially the same pressure as a pressure inside of the mix line 110. For the purpose of this disclosure, the phrase "substantially same," means within a predetermined tolerance. The predetermined tolerance may be, for example, 1, 2, 3, 5, or 10 percent. For example, a first pressure may be substantially the same as a second pressure if the second pressure differs from the first pressure by less than or equal to 10 percent of the first temperature.

Downstream of the air dryer 108, the heated line 118 may include a respective one of the flow regulators 112 and a respective one of the air flow meters 114 as described above. The flow regulator 112 regulates a flow of air flowing through the heated line 118, and the air flow meter 114 measures the flow of air through the heated line 118. The heated line 118 may include the relief valve 120. The relief valve 120 may be downstream of the flow regulator 112 included in the heated line 118 and upstream of the air flow meter 114 included in the heated line 118. The relief valve 120 may be used to protect components of the contamination test rig 100 from over pressure or experiencing a pressure above a component's respective pressure threshold in the event of a failure of control components of the contamination test rig 100, for example, in the event of a mechanical failure of one or more of the flow regulators 112 and/or in the event of a failure of the processor 142. The relief valve 120 may protect hardware components of the contamination test rig 100 such as the air heater 122.

The heated line may include the air heater 122. The air heater 122 may be downstream of the air flow meter 114. The air heater 122 may be any heater capable of heating the air flowing through the heated line 118. For example, the air heater 122 may be an electric air heater, such as a 250 kW inline electric process air heater. The air heater 122 may be controlled by the processor 142 such that the air in the heated line 118 is heated based on a target temperature of the air to be supplied to the test valve 130. The target temperature may be, for example, the same or higher than a target temperature of air to be supplied to an inlet of the test valve 130.

The bleed line 124 may branch off of the heated line 118 downstream of the air heater 122. The bleed line 124 may allow for sufficient air flow through the air heater 122, wherein sufficient means that the bleed line 124 allows for enough air flow through the air heater 122 to prevent damage to the air heater 122 from over temperature or from experiencing a temperature above a temperature threshold of the air heater 122. For example, the bleed line 124 may allow for sufficient air flow through the air heater 122 in the event of low air flow testing of the test valve 130.

The mix line 110 and the heated line 118 may join into a single air flow line at the junction 140. The junction 140 is located downstream of the particle injection chamber 116 of the mix line 110. The junction 140 may be downstream of the air heater 122 and/or downstream of a point where the bleed line 124 branches off of the heated line 118. The junction 140 may, for example, be a T-joint.

The liquid injection pump 126 may be downstream of the junction 140. The liquid injector pump 126 may be any pump capable of injecting liquid contaminates into the flow of air downstream of the junction 140. The liquid contaminates may be, for example, oil and/or salt water. The contamination test rig 100 may include one or more liquid injector pump 126.

The valve line 128 and the by-pass line are downstream of the liquid injector pump 126 and/or the junction 140. The valve line 128 and the by-pass line 132 may be vertically oriented and run be parallel to each other, wherein an inlet to the valve line 128 may disposed be closer to the junction 140 than an inlet to the by-pass line 132.

The valve line 128 may include the test valve 130. The test valve 130 may be downstream of the junction 140 and/or the liquid injector pump 126. The test valve 130 may be a valve for use on an aircraft, for example, a valve used in a gas turbine engine. For example, the test valve 130 may be a pneumatic valve, such as an aircraft accessory valve. As another example, the test valve 130 may be an anti-ice valve (AIV). The test valve 130 may be an AIV that, in operation on an aircraft, is supplied compressor bleed air from an engine of the aircraft. For example, in operation on an aircraft, the AIV may be used to prevent ice build-up on the front of the engine. The AIV, for example, may be fed compressor bleed air from the engine and may heat up the front of the nacelle of the engine.

The by-pass line 132 may include a by-pass valve 134. The by-pass valve 134 may be downstream of the junction 140 and/or liquid injector pump 126. The by-pass valve 134 may be any valve capable of allowing or prohibiting a flow of air from entering an air flow line. For example, the by-pass valve 134 may be a high temperature on/off valve. The by-pass valve 134 may be capable of being in a fully open position or a fully closed position such that no air passes through the by-pass valve 134 when it is closed.

The by-pass line 132 and the valve line 128 may both terminate at the particle separator 136. The particle separator 136 may be downstream of the test valve 130 and the by-pass valve 134. The particle separator 136 may be any separator capable of separating contaminate particles from a flow of air. The particle separator may be, for example, a cyclone separator. The particle separator 136 may exhaust the clean air to the atmosphere once the contaminate particles have been removed from the air.

During operation of the contamination test rig 100, the air source 102 may supply air, for example, high pressure air, to the contamination test rig 100. The air may be supplied at a pressure of, for example, 350 psig. The air may flow from the air source 102 to the air filter 106. The air filter 106 may remove debris and contaminate from the supplied air. The air may flow through one of more of the regulation devices 104 before flowing to the air filter 106. Additionally or alternatively, the air may flow through one of more of the regulation devices 104 after flowing through the air filter 106. The regulation devices 104 may affect the pressure, temperature, and/or mass flow rate of the air upstream and/or downstream of the air filter 106. The regulation devices 104 may be used to control a flow of hot air and/or a flow of cold air to the test line 128 and/or the test valve 130. For example, the regulation devices 104 may control a flow of hot air from the heated line 118 and/or a flow of cold air from the mix line 110. The regulation devices 104 may be electronically controlled by the processor 142.

The air may flow from the air filter 106 and/or from one or more of the regulation devices 104 to the air dryer 108. The air dryer 108 may dry and/or heat the flow of air supplied by the air source 102 in order to keep humidity levels of the air flow constant downstream of the air dryer 108 independent of ambient conditions. In other words, the air dryer 108 may dry the flow of air from the air source 102 to a constant humidity level despite what ambient conditions may be outside of the contamination test rig 100. The constant humidity level may be a humidity level set by the processor 142. The constant humidity level may be based on target operating conditions of the contamination test rig 100, for example, a design requirement of the test valve 130.

Downstream of the air dryer 108, the flow of air splits into two different lines: the mix line 110 and the heated line 118. The portion of the air that flows into the mix line 110 flows from the air dryer 108 through the flow regulator 112 on the mix line 110. The flow regulator 112 on the mix line 110 may regulate the pressure of the air flow in the mix line 110. The processor 142 may control the flow regulator 112 in order to regulate the pressure of the air and/or an amount of air flowing in the mix line 110. The air may be regulated by the flow regulator 112 on the mix line 110 to a determined pressure and/or flow rate that is needed in order to target a specific temperature, pressure, and/or mass flow rate set point at one or more locations in the contamination test rig 100.

The air in the mix line 110 may flow from the flow regulator 112 on the mix line 110 to the air flow meter 114 on the mix line 110. The air flow meter 114 on the mix line 110 may communicate the air pressure and/or the flow rate of the flow of air in the mix line 110 to the processor 142. The air may flow from the flow regulator 112 on the mix line 110 and/or the air flow meter 114 on the mix line 110 to the particle injection chamber 116. The air may flow through a draft tube 200 (shown in FIG. 2) in the particle injection chamber 116. The draft tube 200 may have an opening 202 (shown in FIG. 2) in the draft tube on a part of the draft tube inside of the particle injection chamber 116. Because of the opening 202, the particle injection chamber 116 may be at the same pressure as the flow of air in the mix line 110. As explained in more detail below in connection with FIG. 2, contaminate particles are injected into the flow of air in the draft tube 200 in the particle injection chamber 116. Referring back to FIG. 1, downstream of the particle injection chamber 116, the flow of air in the mix line 110 includes air mixed with the contaminate particles. The mixture of air and contaminate particles in the mix line 110 may flow from the particle injection chamber 116 to the junction 140 of the mix line 110 and the heated line 118.

The flow of air that splits and flows into the heated line 118 from the air dryer 108 may flow through the respective one of the flow regulators 112 disposed in the heated line 118. The processor 142 may control the flow regulator 112 in the heated line 118. The processor 142 may control the flow regulator 112 in the heated line 118 in order to regulate the pressure and/or flow rate of the air in the heated line 118. The air in the heated line 118 may flow from the flow regulator 112 in the heated line 118 to the relief valve 120. The air may flow past the relief valve 120 through the respective one of the air flow meters 114 disposed in the heated line 118. The air flow meter 114 in the heated line 118 may communicate the air pressure and/or the flow rate of the flow of air in the heated line 118 to the processor 142.

The air in the heated line 118 may flow from the flow regulator 112 in the heated line 118, the relief valve 120 in the heated line 118, and/or the air flow meter 114 in the heated line 118 to the air heater 122. The air heater 122 may heat the flow of air in the heated line 118. The processor 142 may control the air heater 122. The air heater 122 may heat the air in the heated line 118 to a predetermined temperature, for example, 800 degrees Fahrenheit, or, any other target temperature. In some examples, the processor 142 may determine the target temperature based on at least one target temperature set point of one of more locations in the contamination test rig 100, for example, at the inlet of the test valve 130. The air in the heated line 118 may flow from the air heater 122 to the junction 140 of the mix line 110 and the heated line 118.

The flow of air from the heated line 118 and the flow of the mixture of air and contaminate particles from the mix line 110 may mix together at the junction 140 to form a single flow of air that is also a mixture of air and contaminate particles. The air flow meters 114 may communicate with the processor 142. The regulation devices 104, the flow regulators 112, the relief valves 120, the air dryer 108, and/or the air heater 122 may be controlled by the processor 142 in order to ensure that the air flow of the mixed air at the junction 140 meets a set temperature, mass flow rate, and/or pressure. The set temperature, mass flow rate, and/or pressure may be set based on target requirements of the contamination test rig 100. For example, the target requirements may correspond to design requirements of the test valve 130.

In some examples, the liquid injector pump 126 may inject the liquid contaminates into the flow of the mixture of air and dry contaminate particles downstream of the junction 140. Downstream of the liquid injector pump 126, the air and contaminate mixture may flow into the valve line 128. Air may flow through the test valve 130 disposed in, and/or coupled to, the valve line 128. The regulation devices 104, the flow regulators 112, the relief valves 120, the air dryer 108, and/or the air heater 122 may be controlled by the processor 142 in order to ensure that the air flow at the test valve 130 meets a set temperature, mass flow rate, and/or pressure such that the test valve 130 experiences temperatures, pressures, and/or mass flow rate representative of operating conditions in the field. The operating conditions may be, for example, a gas turbine engine during idle, cruse, and/or maximum power, which the test valve 130 must be able to withstand.

When the test valve 130 is open, the by-pass valve 134 in the by-pass line 132 may be closed such that the air and contaminate mixture does not flow through the by-pass line 132. When the test valve 130 is closed, the by-pass valve 134 may be open, allowing for the air and contaminate mixture to flow through the by-pass line 132.

Because the by-pass line is located further away from the junction 140 than the valve line 128, when the test valve 130 is closed and the by-pass valve 134 is open, air and contaminate mixture may still flow to the test valve 130. The test valve 130 may leak when closed. This is known as a leakage condition, and is common for used valves. When the by-pass valve 134 is open and the test valve 130 is closed, the air and contaminate mixture flowing to the test valve 130 may simulate a leakage condition of the test valve 130 by allowing contaminate particles to be drawn up into the test valve 130. The test valve 130 may be tested both when the test valve 130 is open or closed. When the test valve 130 is closed, it may be subject to leakage flow across the test valve 130. The leakage flow across the test valve 130 may simulate when, for example, an AIV in an aircraft experiences leakage across the valve and draws contaminate particles from bleed air into the AIV.

Air and contaminate mixture may flow through the valve line 128 and the test valve 130 to a particle separator downstream of the test valve 130. Alternatively or additionally, air and contaminate mixture may flow through the by-pass line 132 and the by-pass valve 134 to a particle separator downstream of the by-pass valve 134. The particle separator 136 may remove the contaminate particles from the air flows before the air is released into the atmosphere.

Figure 2:
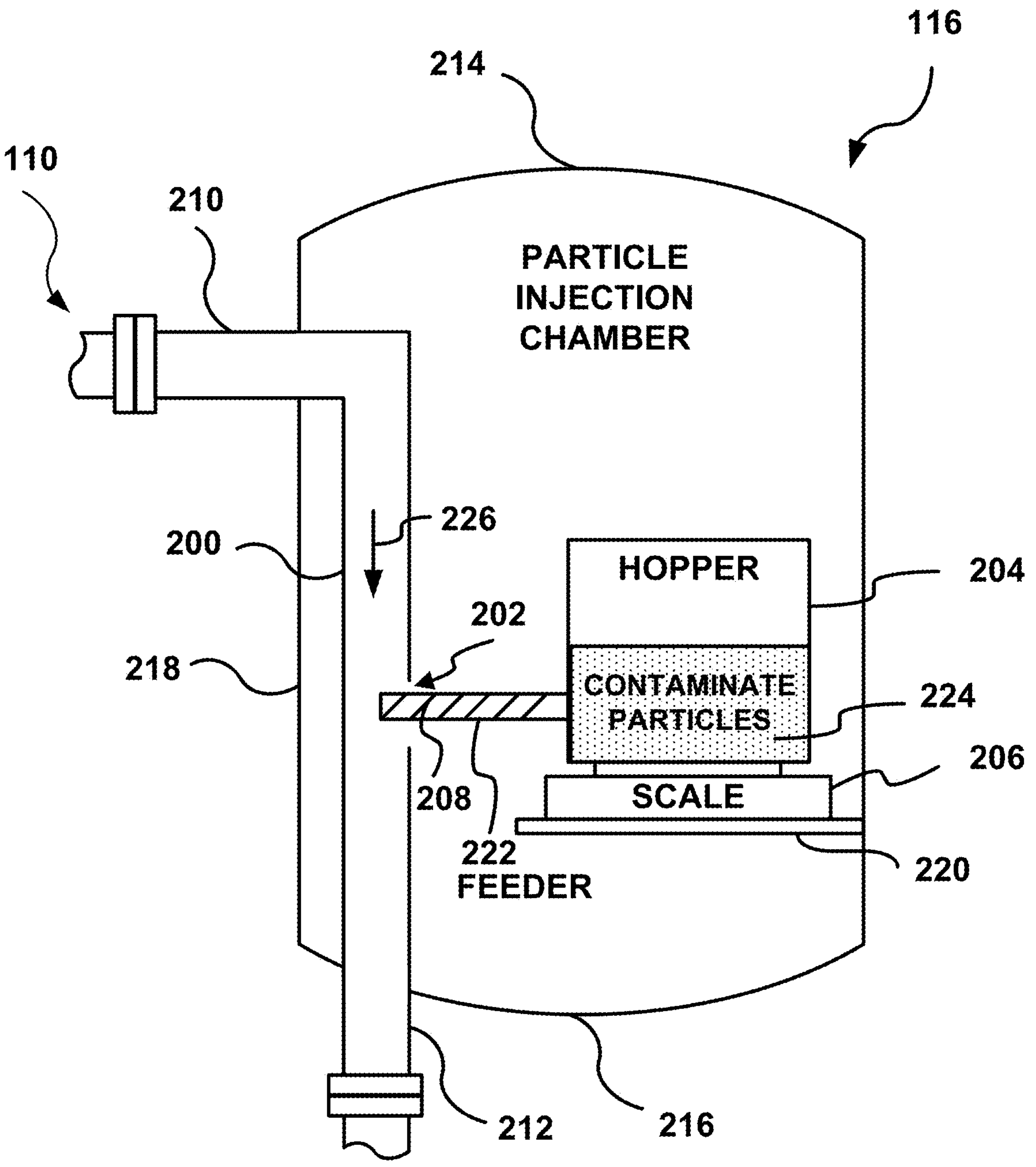
FIG. 2 is a cross-sectional view of an example of a particle injection chamber.

FIG. 2 is a cross-sectional view of an example of the particle injection chamber 116 of the contamination test rig 100 in FIG. 1. The particle injection chamber 116 is disposed on the mix line 110. In other words, the mix line 110 may extend through the particle injection chamber 116 as shown in FIG. 2. The particle injection chamber 116 comprises the draft tube 200, the opening 202 in the draft tube 200, a hopper 204, a scale 206, a blade 208, a platform 220, and a feeder 222 that includes the blade 208. The particle injection chamber 116 may be cylindrical in shape with a rounded top 214 and a rounded bottom 216 opposite the top 214. However, the particle injection chamber 116 may have any other suitable shape. A side 218 of the particle injection chamber 116 may extend from the top 214 of the particle injection chamber 116 to the bottom 216 of the particle injection chamber 116. The terms "top" and "bottom" refer to an orientation of the particle injection chamber 116 where the force of gravity is in a direction extending from the top to the bottom. The particle injection chamber 116 may be a pressure chamber in which the interior of the particle injection chamber 116 may be at a pressure that is substantially the same as a pressure of the air in the mix line 110. For example, a casing of the particle injection chamber may be a pressure chamber. For example, the particle injection chamber 116 and the flow of air 226 in the mix line 110 may be at 200 psi or any other target pressure. The opening 202 in the draft tube 200 enables the pressure in the interior of the particle injection chamber 116 to be substantially the same as the pressure of the air in the mix line 110, An inlet conduit 210 may make up a portion of the mix line 110 and may couple an upstream portion of the mix line 110 to the particle injection chamber 116. The inlet conduit 210 may couple to the particle injection chamber 116 on the side 218 of the particle injection chamber 116 near the top 214 of the particle injection chamber 116. The inlet conduit 210 may couple to the draft tube 200 disposed inside of the particle injection chamber 116.

The draft tube 200 may make up a portion of the mix line 110. The draft tube 200 may extend into the particle injection chamber 116 from the side 218 of the particle injection chamber 116 near the top 214. In some examples, the draft tube 200 may comprise a 90 degree bend such that the draft tube 200 extends into the particle injection chamber 116 near the top 214, bends 90 degrees, and extends parallel to the side 218 of the particle injection chamber 116 and couples to an outlet conduit 212 at the bottom 216 of the particle injection chamber 116. In other examples the draft tube 200 may have a different shape than illustrated in FIG. 2. The outlet conduit 212 may couple the bottom 216 of the particle injection chamber 116 to a downstream portion of the mix line 110.

The opening 202 of the draft tube 200 may be disposed on a portion of the draft tube 200 that extends parallel to the side 218 of the particle injection chamber 116. In some examples, the draft tube 200 may include additional openings within the particle injection chamber 116.

The platform 220 may extend into the particle injection chamber 116 from, for example, the side 218 of the particle injection chamber 116. The platform 220 may extend into the particle injection chamber 116 perpendicular to the side 218. A scale 206 may be disposed on the platform 220. Alternatively or in addition, the platform 220 may be coupled to the particle injection chamber 116 in other ways. For example, the platform 220 may be coupled to the bottom 216 of the particle injection chamber 116.

The scale 206 may be coupled to the platform 220, for example, with mechanical fasteners, such as screws and/or bolts. The scale 206 may be, for example, a weigh scale or any other device capable of measuring weight in relatively small increments. The scale 206 may communicate with the processor 142. The scale 206 is designed to fit inside of the particle injection chamber 116, wherein the particle injection chamber 116 is a pressure chamber. The scale 206 is designed to be able to tolerate the high pressure conditions of the pressure chamber particle injection chamber 116. The range of the scale 206 may be selected to closely match the combined total weight of the hopper 204, the feeder 222, the blade 208, and the contaminate particles 224 inside of the hopper 204 and feeder 222. The range of the scale 206 may be selected for maximum weight reading resolution, or alternatively, sufficient weight reading resolution, in order to discern relatively small changes in the combined total weight of the hopper 204, the feeder 222, the blade 208, and the contaminate particles 224 inside of the hopper 204 and feeder 222 due to flow of contaminate particles 224 being pushed from the feeder 222 into the draft tube 200. The scale 220 may be able to discern the relatively small weight change of an amount of contaminate particles 224 that have been pushed from the feeder 222 into the flow of the air in the mix line 110 over a specific period of time or during a certain number of rotations of the blade 208.

The hopper 204 may be disposed on the scale 206. The hopper 204 may be a funnel or any device capable of containing contaminate particles 224 and, in some cases, funneling the contaminate particles 224 in a desired direction. The hopper 204 may be modified for zero sealing such that the hopper 204 can operate under high pressure, for example, 200-300 psi. Additionally or alternatively, the hopper 204 may be vented and/or made of materials such that the hopper 204 may survive high pressures, such as 200-300 psi.

A feeder 222 may be coupled to the hopper 204. The feeder 222 may extend from the hopper 204 through the opening 202 of the draft tube 200. The feeder 222 may extend into the draft tube 200. The feeder 222 may extend through the opening 202 of the draft tube 200 without contacting a perimeter of the opening 202 or sides of the draft tube 200. The feeder 222 may be any device capable of conveying the contaminate particles 224 from the hopper 204 into the draft tube 200. Examples of the feeder 222 may include, a conveyor, a screw conveyor, and an auger. The feeder 222 may be alternatively referred to as a conveyor. The conveyor may be any type of conveyor, such as a screw conveyor, an auger, or a belt conveyor. The feeder or conveyor 222 may comprise the blade 208. The blade 208 is any component of the feeder 222 that contacts the contaminate particles 224 in the hopper 204 and pushes the contaminate particles 224 into the draft tube 200. The blade 208 may be, for example, a helical screw blade, a flat blade, or any other shaped blade. In some examples, the blade 208 may rotate within the feeder 222 and within the hopper 204. In other examples, the blade 208 may be attached to a conveyor belt and/or a conveyor belt.

During operation, air may flow through the mix line 110 into the particle injection chamber 116. The air may flow through the particle injection chamber via the draft tube 200. The hopper 204 may contain the contaminate particles 224, for example, sand, dirt, and/or dust. The hopper 204 may funnel the contaminate particles 224 towards the feeder 222.

The feeder 222 may convey the contaminate particles 224 from the hopper 204 into the flow of air 226 in the draft tube 200. The feeder 222 may push the contaminate particles 224 into the draft tube 200 such that the air in the draft tube 200 mixes with the contaminate particles 224 and carries the contaminate particles 224 downstream. For example, the blade 208 may rotate such that the blade collects the contaminate particles 224 from a bottom of the hopper 204 and conveys the contaminate particles 224 through a length of the feeder and towards an end of the feeder 222 that extends into the draft tube 200. The blade 208 may push the contaminate particles 224 from the feeder 222 into the draft tube 200. The mix of air and contaminate particle may flow through the draft tube 200 towards the bottom 216 of the particle injection chamber 116, through the outlet conduit 212, and/or downstream to the junction 140 (referring to FIG. 1). The hopper 204, feeder 222, and/or the blade 208 may be controlled by the processor 142.

The scale 206 may communicate the amount of the contaminate particles 224 being pushed into the mix line 110 with the processor 142. Alternatively or additionally, one of more of the flow regulators 112 in the mix line 110 and/or heated line 118 may communicate the flow rate of the mix line 110 and/or the heated line 118 to the processor 142. Alternatively or additionally, a flow meter and/or sensor at the test valve 130 may communicate a flow rate experienced at the test valve 130 to the processor 142.

The processor 142 may control the rate at which the feeder 222 and/or the blade 208 push the contaminate particles 224 into the draft tube 200 based on a contaminate target mass flow rate of the test valve 130. The target mass flow rate may, for example, be based on design requirements of the test valve 130. For example, if the contaminate target mass flow rate is below a target flow rate of the test valve 130, the processor 142 may increase the rate and/or amount of the contaminate particles 224 pushed into the draft tube 200 by the feeder 222. Alternatively or additionally, the processor 142 may increase the flow rate of the mix line 110 by adjusting the flow regulator 112 of the mix line 110. If the contaminate target mass flow rate is above the target flow rate of the test vale 130, the processor 142 may decrease the rate and/or amount of the contaminate particles 224 pushed into the draft tube 200 by the feeder 222. Alternatively or additionally, the processor 142 may decrease the flow rate of the mix line 110 by adjusting the flow regulator 112 of the mix line 110.

Referring back to FIG. 2, the scale 220 may supply the weight of the hopper 204, the feeder 222, the blade 208, and/or the contaminate particles 224 inside the hopper 204 and the feeder 222. The scale 220 may detect the change in weight of the hopper 204, the feeder 222, and/or the contaminate particles 224 in the hopper 203 and the feeder 222 as the feeder 202 pushes the contaminate particles 224 from the feeder 222 into the draft tube 200. The processor 142 may control the hopper 204, feeder 222, and/or blade 208 in order to disperse the contaminate particles 224 into the draft tube 200 at a target mass flow rate of the contaminate particles 224. The processor 142 may control and/or alter the rate of the contaminate particles 224 being dispersed and/or the amount of the contaminate particles 224 being dispersed based on feedback from the scale 206. The target mass flow rate of the contaminate particles 224 may be based on representative operating conditions of, for example, a gas turbine engine during idle, cruse, and/or max power, which the test valve 130 must be able to withstand.

Figure 3:
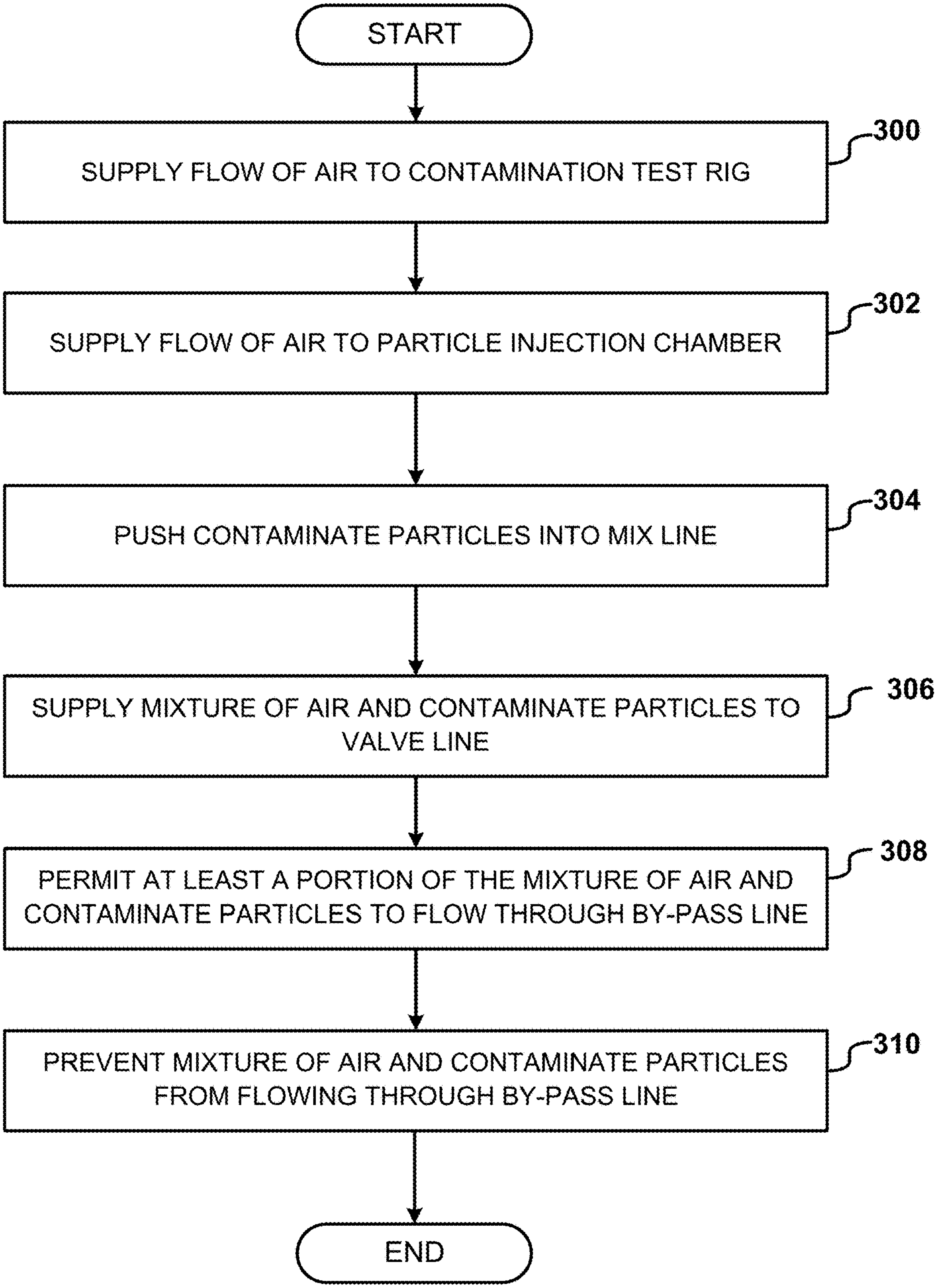
FIG. 3 illustrates a flow diagram of example steps for operating a contamination test rig.

FIG. 3 illustrates a flow diagram of example steps for operating the contamination test rig 100 of FIG. 1. Operation may begin, for example, by supplying (300) the flow of air 226 to the mix line 110 of the contamination test rig 100 from the air source 102. The flow of air 226 may be supplied (302) to the particle injection chamber 116 via the mix line 110, wherein the particle injection chamber 116 may include a pressure chamber.

The blade 208 may push (304) the contaminate particles 224 through the opening 202 of the mix line 110 into the mix line 110. The opening 202 of the mix line 110 may be inside of the particle injection chamber 116, wherein the mix line 110 and the particle injection chamber 116 may be at substantially the same pressure.

The mixture of air and the contaminate particles 224 may be supplied (306) from the particle injection chamber 116 to the valve line 128. The mixture may be supplied to the test valve 130 if the test valve 130 is coupled to the valve line 128.

At least a portion of the mixture of the air and the contaminate particles 224 may be permitted (308) to flow through the by-pass line 132 by opening a by-pass valve 134. The by-pass line 134 may be arranged in parallel with the valve line 128. Alternatively or additionally, the mixture of air and the contaminate particles 224 may be prevented (310) from flowing through the by-pass line 132 by closing the by-pass valve 134.

The steps may include additional, different, or fewer steps than illustrated in FIG. 3. The steps may be executed in a different order than illustrated in FIG. 3. For example the step of permitting (308) at least a portion of the mixture of the air and the contaminate particles 224 to flow through the by-pass line 132 may come before the step of preventing (310) the mixture of air and the contaminate particles 224 from flowing through the by-pass line 132. Alternatively, the step of preventing (310) the mixture of air and the contaminate particles 224 from flowing through the by-pass line 132 may come before the step of permitting (308) at least a portion of the mixture of the air and the contaminate particles 224 to flow through the by-pass line 132. Alternatively or additionally, any one of the steps illustrated in FIG. 3 may occur multiple times and/or in any order.

Although the flow chart in FIG. 3 may appear to imply that the steps illustrated are performed in series, any of the steps illustrated in FIG. 3 may be performed simultaneously. For example, supplying (300) the flow of air 226 to the mix line 110 may occur while pushing (304) the contaminate particles 224 through the opening 202 of the mix line 110 into the mix line 110.

Each component may include additional, different, or fewer components. For example, the feeder 222 and/or the hopper 204 may include a motor. Additionally or alternatively, for example, the contamination test rig 100 may contain additional valves, sensors, flow meters, pressure regulators, temperature regulators, mass flow rate regulators, bleed lines, relief valves, orifice plates, and/or orifice plate mass flow meters.

The contamination test rig 100 may, for example, test a component that gas flows through other than the test valve 130 instead of or in addition to the test valve 130. For example, the contamination test rig 100 may be used for contaminate testing of the component that gas flows through. The component may, for example, be any component used in an aircraft, for example, any component of a gas turbine engine or auxiliary system of an aircraft. The component may be, for example, a flow restrictor, an injector, and/or a nozzle. The component may be, for example, a pneumatic valve, such as a regulating valve, a check valve, an on/off valve, and/or any other similar type of valve.

Additionally, or alternatively, the contamination test rig 100 may include a memory 144, the processor 142, and a network interface 146. The processor 142 may be in communication with the memory 144 and a network interface 146. The processor 142 and other components of the contamination test rig 100 may be in communication with each other. For example, the air source 102, the regulation devices 104, the air dryer 108, one or more of the flow regulators 112, one or more of the air flow meters 114, the particle injection chamber 116, the relief valve 120, the air heater 122, the bleed line 124, the liquid injector pump 126, the test valve 130, the by-pass valve 134, the hopper 204, the scale 206, the blade 208, and/or the feeder 222 may be in communication with the processor 142. Additionally or alternative, the processor 142 may be in communication with one or more sensors located in the junction 140, the mix line 110, the heated line 118, the valve line 128, and/or the by-pass line 132. The sensors may be, for example, pressure sensors, flow sensors, and/or temperature sensors. There may be, for example, optical and/or electrical connections between the controller 142 and each one of the components of the contamination test rig 100 by which the processor 142 and one or more of the components communicate.

In one example, the processor 142 may also be in communication with additional elements, such as a display. Examples of the processor 142 may include a general processor, a central processing unit, a microcontroller, a server, an application specific integrated circuit (ASIC), a digital signal processor, a field programmable gate array (FPGA), a controller, a PLC, and/or a digital circuit, analog circuit.

The processor 142 may be one or more devices operable to execute logic. The logic may include computer executable instructions or computer code embodied in the memory 144 or in other memory that when executed by the processor 142, cause the processor to perform the features implemented by the logic. The computer code may include instructions executable with the processor 142. In one example, the processor 142 may be a processor in a computer on which automation software or systems engineering software, such as the software sold under the LABVIEW® mark (LABVIEW is a federally registered mark owned by National Instruments Corporation of Austin Tex.) is installed.

Figure 4:
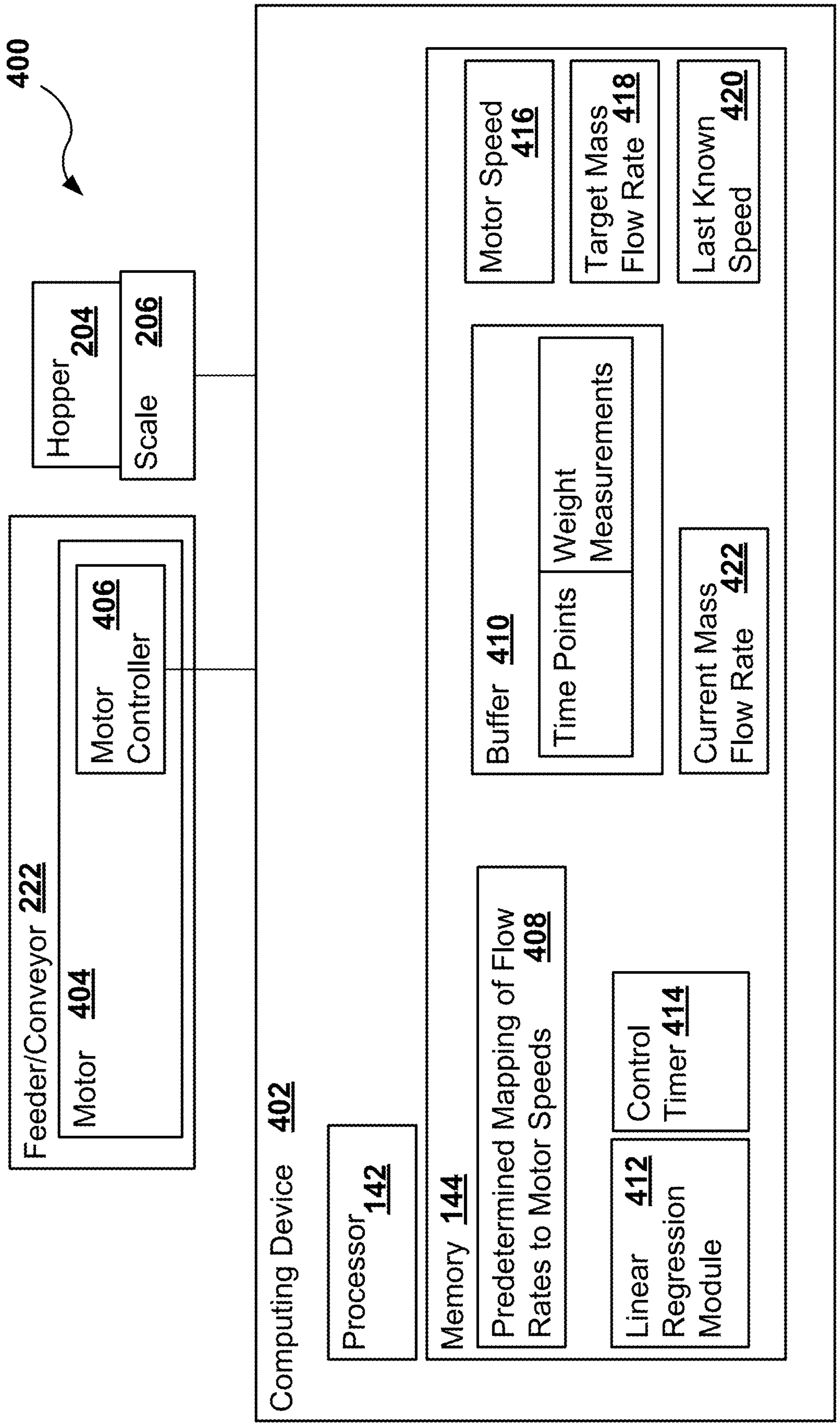
FIG. 4 is a schematic diagram of an example of a system for controlling delivery of contaminates.

FIG. 4 is a schematic diagram of an example of a system 400 for controlling delivery of contaminates. The system 400 for controlling delivery of contaminates may be included in the contamination test rig 100. Alternatively, the system 400 for controlling delivery of contaminates may be entirely unrelated to the contamination test rig 100, and be a part of some other testing system.

The system 400 for controlling delivery of contaminates illustrated in FIG. 4 includes the conveyor 222, the scale 206, the hopper 204 and a computing device 402. The system 400 may include additional, fewer, or different components than illustrated.

The conveyor 222 is configured to move contaminate particles from the hopper 204 into an airflow, such as the flow of air 226 in the mix line 110 of the contamination test rig 100 as shown in FIG. 2. The conveyor 222 includes a motor 404 configured to drive the conveyor 222. For example, the motor 404 may be mechanically coupled to a screw conveyor (the blade 208), so that as the motor 404 rotates, the screw conveyor rotates. In some examples, the motor 404 may include a motor controller 406. The motor controller 406 may be configured to receive a motor speed, for example from the computing device 402, and cause the motor 404 to rotate at the received motor speed. In alternative examples, the motor controller 406 may be included in a component other than the motor 404, such as a different part of the conveyor 222 or in the computing device 402.

The scale 206 is configured to measure the weight of contents of the hopper 204. The scale may weigh the hopper 204 in addition to any contents of the hopper 204. The hopper 204 may hold contaminate particles, for example, in powder form. In some examples, a weight measurement made by the scale 206 may include the combined weight of the hopper 204 and its contents. In alternative examples, a weight measurement made by the scale 206 may include only the weight of the contents of the hopper 204. The latter is possible, for example, by "zeroing out" the scale 206 when the hopper 204 is empty.

The computing device 402 may be any type of computing device such as a computer, a laptop, a mobile device, a server, and/or a controller. The computing device 402 may be any device that includes a processor, such as the processor 142 shown in FIG. 4. The computing device 402 includes the processor 142 and the memory 144. The processor 142 and the memory 144 may be the processor 142 and the memory 144 included in the contamination test rig 100. Alternatively, the computing device 402 may include a processor and a memory different than the processor 142 and the memory 144 included in the contamination test rig 100. The processor 142 may be in communication with the motor 404 and the scale 206. The processor 142 may be said to be in communication with the motor 404 if, for example, the processor 142 is in communication with the motor controller 406.

The memory 144 may be any device for storing and retrieving data or any combination thereof. The memory 144 may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device. The memory 144 shown in FIG. 4 includes a predetermined mapping 408 of flow rates to motor speeds, a buffer 410, a linear regression module 412, a control timer 414, and variables such as a motor speed 416, a target mass flow rate 418, a current mass flow rate 422, and a last known speed 420.

During operation of the system 400 for controlling delivery of contaminates, the system 400 uses closed loop feedback in order to control the motor speed 416 so as to achieve the target mass flow rate 418 of contaminate particles flowing from the hopper into the airflow. The closed loop feedback control is described below.

The processor 142 causes the motor, which drives the conveyor 222, to rotate at the motor speed 416. For example, the processor 142 sends an instruction to the motor controller 406 identifying the motor speed 416. While the motor 404 rotates at the motor speed 416, the conveyor 222 moves contaminate particles from the hopper 204 into the airflow. The motor speed 416 corresponds to the target mass flow rate 418. In other words, the motor speed 416 is selected by the processor 142 with a goal of achieving the target mass flow rate 418. Details of how to initially select the motor speed 416 are provided further below. In some examples, the target mass flow rate 418 is in a range of 0.01 to 0.0001 pounds per minute. In other examples, the mass flow rate may be within a different range.

Figure 5:
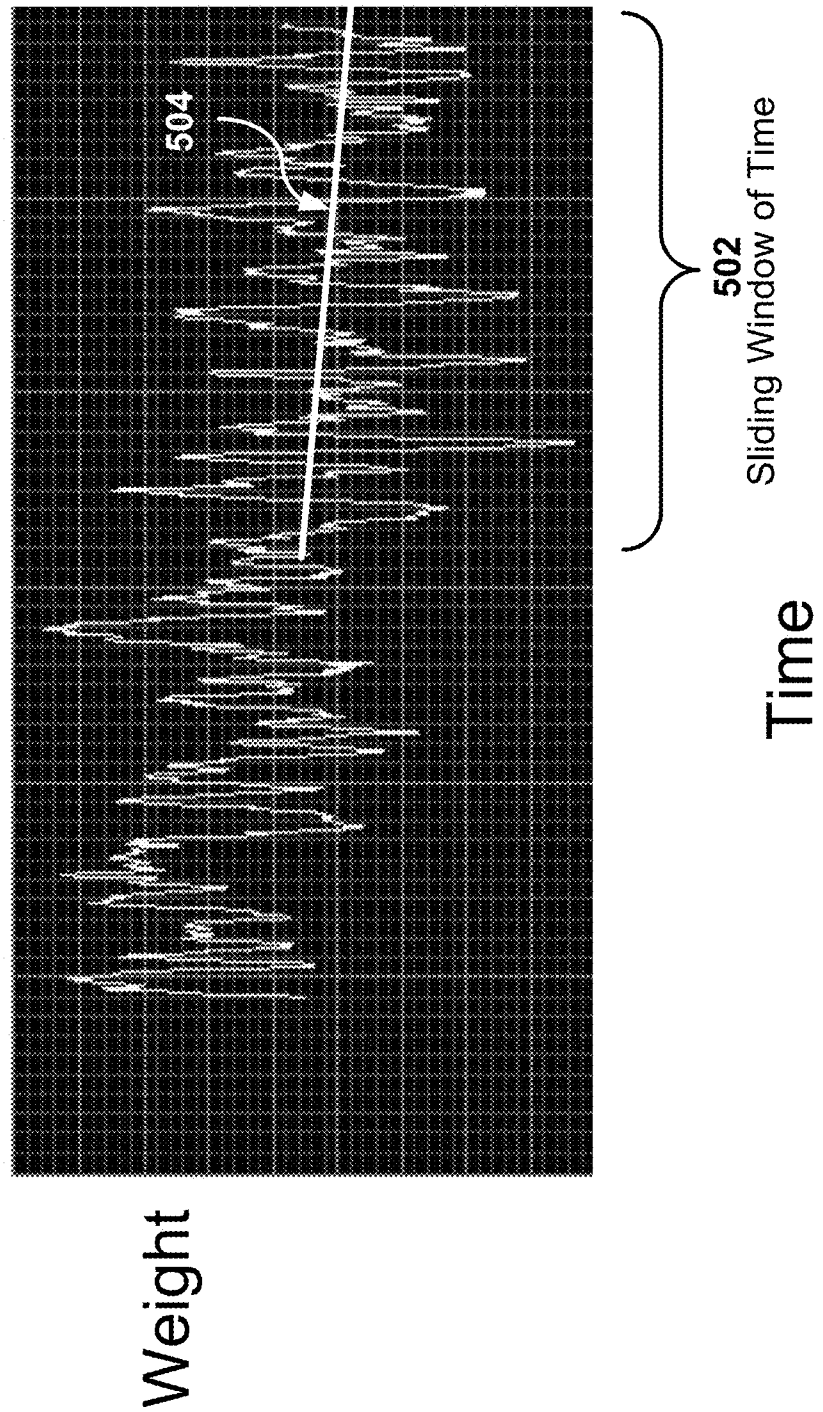
FIG. 5 is a graph of an example of multiple time points and corresponding weight measurements taken at those time points.

The scale 206 weighs the contents of the hopper 204 at multiple time points within a sliding window of time by taking multiple weight measurements. Examples of the weight measurements taken at multiple time points are shown in FIG. 5. FIG. 5 is a graph of an example of multiple time points and the corresponding weight measurements taken at those time points. The time points may be time stamps, timer values, seconds elapsed since a fixed point in time such as Jan. 1, 1970, or any other indication of time.

A sliding window of time 502 represents a time duration D ending, for example, with the most recently taken weight measurement. The sliding window of time 502 may be a duration in a range of 2 to 4 minutes. Alternatively, the duration may be any other suitable time. The magnitude of the weight measurements may vary widely from weight measurement to weight measurement. There are several reasons for such variability. First, the weight of contaminate particles flowing from the hopper 204 may be small relative to the total weight of the hopper 204 and its contents. This may result in noise due to tolerance limitations of the scale 206. Second, contaminate particle sizes exiting the hopper 204 may vary substantially over time, thereby causing variances in the weight measurements taken over the same time frame.

The processor 142 applies linear regression (also called "linear regression analysis") to a data set comprising, from within the sliding window of time 502, the time points as an independent variable and the weight measurements as a dependent variable. The result of the linear regression is a determination of a line 504 fitting the data set. The determination of the line 504 may include for example, a slope of the line and an offset, a set of points on the line, or any other mechanism for identifying a line. The processor 142 may perform the linear regression using the linear regression module 412. The linear regression may be performed using any algorithm for performing linear regression analysis. In linear regression, relationships are modeled using linear predictor functions whose unknown model parameters are estimated from the data. Such models are called linear models. Most commonly, the conditional mean of the response given the values of the explanatory variables (or predictors) is assumed to be an affine function of those values; less commonly, the conditional median or some other quantile is used. Linear regression models are often fitted using the least squares approach, but the models may also be fitted in other ways, such as by minimizing the "lack of fit" in some other norm (as with least absolute deviations regression), or by minimizing a penalized version of the least squares cost function as in ridge regression (L2-norm penalty) and lasso (L1-norm penalty).

The processor 142 may determine the current mass flow rate 422 of the contaminate particles from the slope of the line 504 fitting the data set. For example, the slope of the line 504 represents the change in weight over change in time, which is the current mass flow rate 422. Depending on the units of, respectively, the weight measurements, the time points, and the current mass flow rate 422, the slope of the line 504 may need to be converted to the appropriate units in order to obtain the current mass flow rate 422 from the slope.

The processor 142 may determine an estimated change in the motor speed 416 needed to achieve the target mass flow rate 418 from the predetermined mapping 408 of flow rates to motor speeds. The predetermined mapping 408 of the flow rates to motor speeds may be any mapping of flow rates to motor speeds that models the relationship between the mass flow rate delivered by the conveyor 222 and the motor speed 416 of the motor 404. The model may only approximate the relationship, and thus, may not be very accurate. In some examples, the predetermined mapping 408 may include a table or an array of mass flow rates and corresponding motor speeds. In other examples, the predetermined mapping 408 may include a function that takes the mass flow rate as an input and outputs the motor speed that causes the conveyor 222 to deliver the mass flow rate provided as input to the function.

The mapping 408 is called "predetermined" because the mapping 408 is established prior to the general operation of the system 400 and/or during a calibration mode. For example, in an open control loop configuration, the motor speed 416 may be incrementally increased through a range of motor speeds and for each motor speed, a corresponding mass flow rate may be determined from weight measurements made by the scale 206. Alternatively or in addition, the equation of a function that models the relationship between the motor speed 416 and the mass flow rate delivered by the conveyor 222 may be determined, and the equation of the function may be the mapping 408. For example, linear regression may be applied to the motor speeds and the corresponding flow rates used and detected in the open control loop configuration in order to find an equation of a line that maps flow rates to motor speeds.

Figure 6:
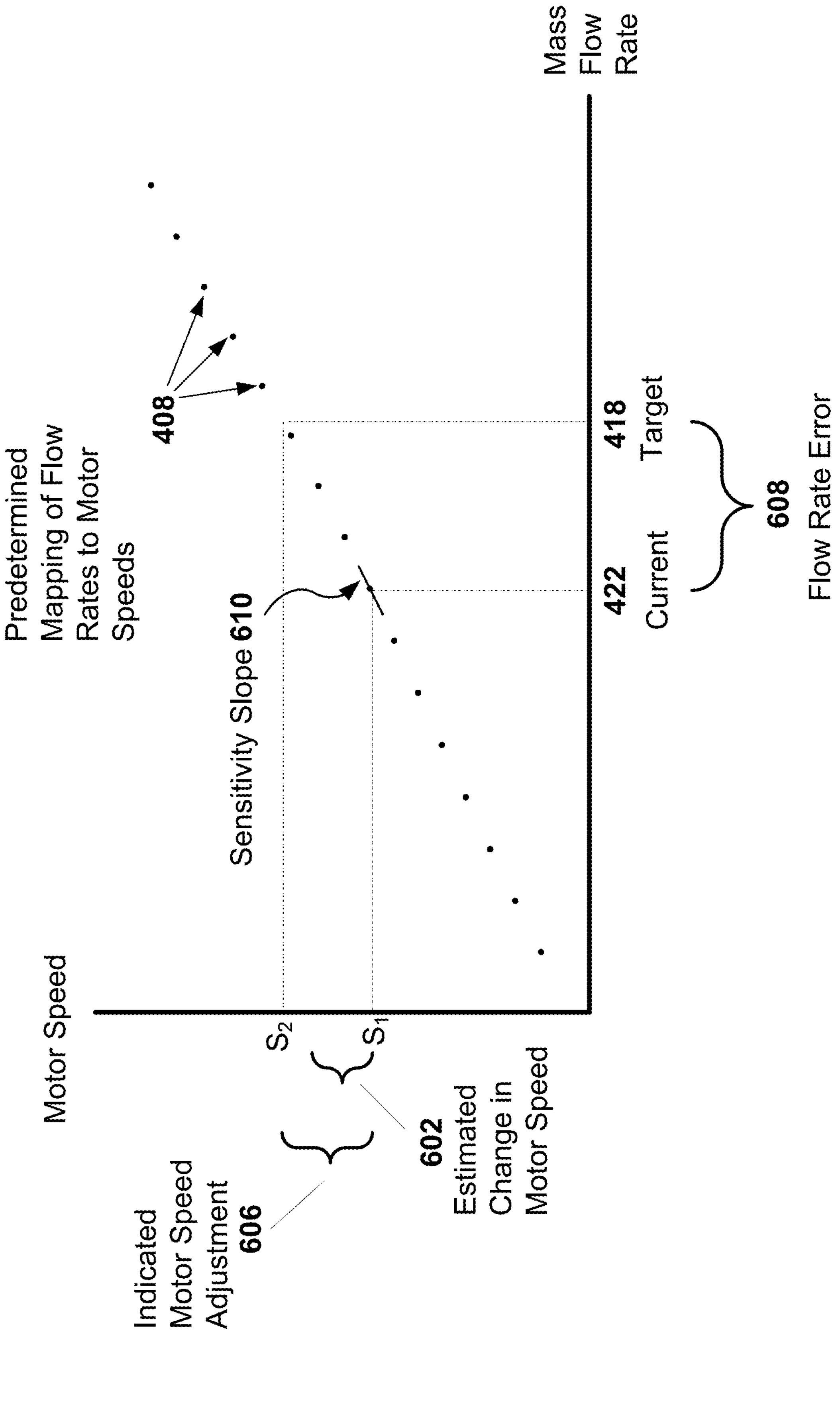
FIG. 6 illustrates an example of the determination of an estimated change in motor speed needed to achieve a target mass flow rate from a predetermined mapping of flow rates to motor speeds.

FIG. 6 illustrates an example of the determination of the estimated change 602 in the motor speed 416 needed to achieve the target mass flow rate 418 from the predetermined mapping 408 of flow rates to motor speeds. In the example shown in FIG. 6, the predetermined mapping 408 is a collection of motor speed/mass flow rate pairs.

The processor 142 may determine the estimated change 602 in the motor speed 416 based on the current mass flow rate 422 and the target mass flow rate 418, where the estimated change 602 is determined to be a fraction of a motor speed adjustment 606 that the predetermined mapping 408 of flow rates to motor speeds indicates from only the current mass flow rate 422 and the target mass flow rate 418.

For example, determining the estimated change 602 in the motor speed 416 may include the following steps. A flow rate error 608 may be determined as a difference between the current mass flow rate 422 and the target mass flow rate 418. A sensitivity slope 610 may be determined as a change in motor speed divided by a change in flow rate at the current mass flow rate 422 from the predetermined mapping 408 of flow rates to motor speeds. In the illustrated example, the sensitivity slope 610 is substantially the same for all mass flow rates because all of the motor speed/mass flow rate pairs are located on one line having one slope. Alternatively or in addition, the sensitivity slope 610 may be calculated as the difference in motor speeds divided by the difference in mass flow rates of two adjacent motor speed/mass flow rate pairs nearest to the current mass flow rate 422. In still other examples, the sensitivity slope 610 may be determined as the mathematical derivative of a function included in the predetermined mapping 408, and the derivative is evaluated at the current mass flow rate 422. Next, the estimated change 602 in the motor speed is calculated as the product of: the sensitivity slope 610, the flow rate error 608, and a fraction.

The fraction may be any real number between 0 and 1. In some examples, the fraction is in a range of 0.3 to 0.8. In still other examples, the fraction is in a range of 0.4 to 0.7. In one example, the fraction is 0.5. The fraction may be a predetermined constant.

The estimated change 602 in the motor speed 416 may be determined using still other methods. For example, a first motor speed, $S_1$, corresponding to the current mass flow rate 422 may be determined from the predetermined mapping 408. Similarly, a second motor speed, $S_2$, corresponding to the target mass flow rate 418 may be determined from the predetermined mapping 408. The indicated motor speed adjustment 606 may be calculated as the second motor speed, $S_2$, minus the first motor speed, $S_1$. The estimated change 602 in the motor speed 416 may be calculated as the predetermined fraction (for example, 0.5) multiplied by the indicated motor speed adjustment 606.

It is contemplated that any method of determining the estimated change 602 in the motor speed 416 may be used where the estimated change 602 is determined from the predetermined mapping 408 based on the current mass flow rate 422 and the target mass flow rate 418, and where the estimated change 602 is determined to be a fraction of the indicated motor speed adjustment 606. The above described examples of determining the estimated change 602 in the motor speed 416 are merely non-limiting examples.

Having determined the estimated change 602 in the motor speed 416, the processor 142 may cause the estimated change 602 in the motor speed 416. For example, the processor 142 may change the motor speed 416 and send the changed motor speed to the motor 404.

As explained above, the system 400 uses closed loop feedback to control the motor speed 416 in order to achieve the target mass flow rate 418 of contaminate particles flowing from the hopper 204 into the airflow. The process of the scale 206 weighing the contents of the hopper 204 at multiple time points may occur more frequently than determining the estimated change 602 in the motor speed 416. In some examples, the former process may be performed by invoking a delivery flow rate logic, and the latter process may be performed by invoking a fractional step closed loop control logic. Examples of the delivery flow rate logic and the fractional step closed loop control logic are provided below.

Figure 7:
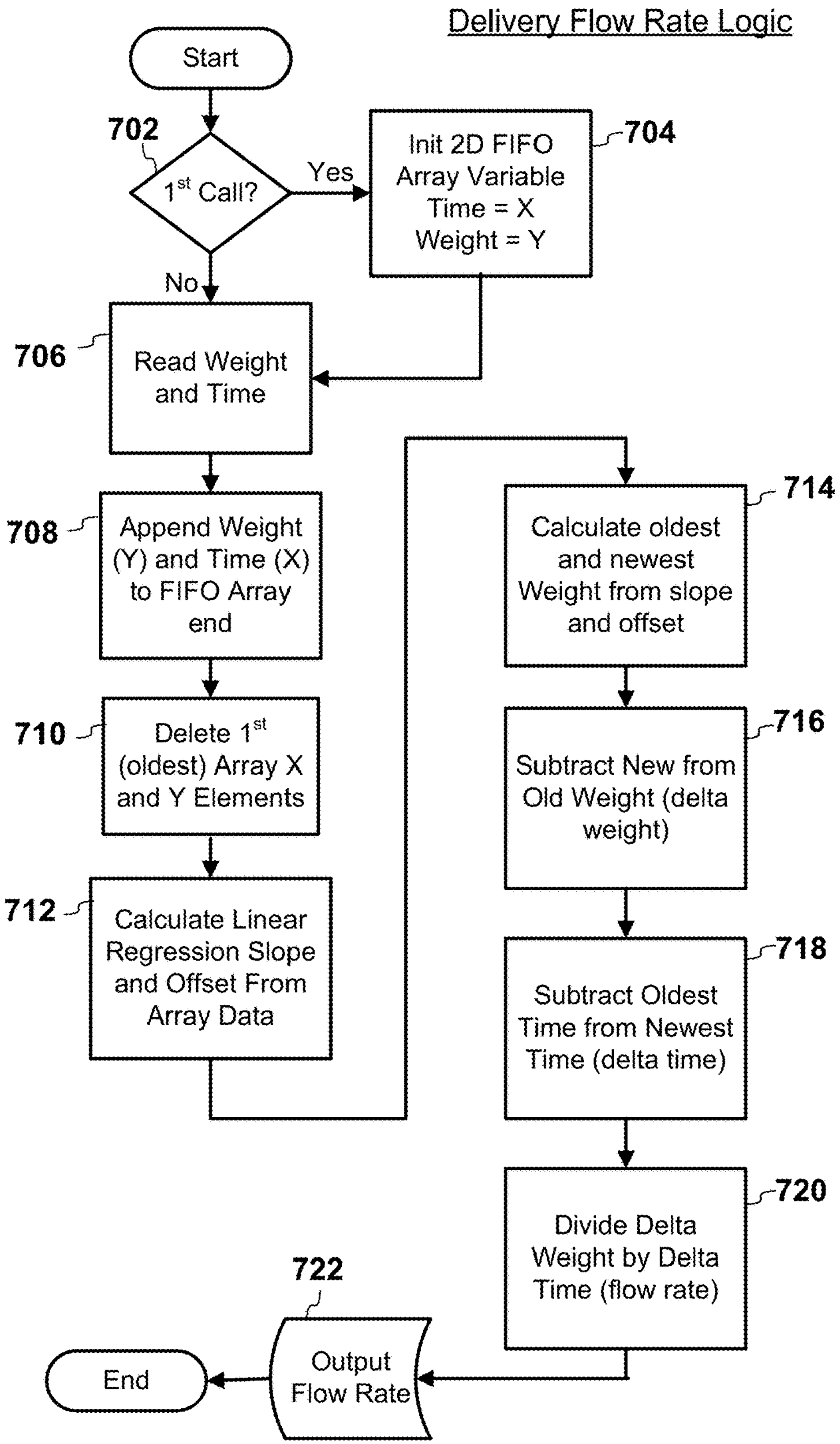
FIG. 7 illustrates a flow diagram of an example of delivery flow rate logic that is invoked each time the scale is to take a weight measurement.

FIG. 7 illustrates a flow diagram of an example of the delivery flow rate logic that is invoked each time the scale 206 is to take a weight measurement. The first operation may be to determine (702) if the delivery flow rate logic is being called for the first time after the conveyor 222 is powered up. If yes, then the buffer 410 may be initialized (704), and then the weight measurement and the corresponding time point may be read (706). Alternatively, if the delivery flow rate logic is not being called for the first time after the conveyor 222 is powered up, then the weight measurement and the corresponding time point may be read (706) without initializing (704) the buffer 410. The buffer 410 may be, for example, a FIFO (first in, first out).

Next, the weight measurement and the time point may be appended (708) onto the end of the buffer 410. The oldest weight measurement and time point may be deleted from the buffer 410 to make room for new buffer entries, such as the weight measurement and the time point that are appended (708) onto the end of the buffer 410.

Linear regression may be applied (712) to the data set comprising the time points and the weight measurements that are within the sliding window of time 502, which results in, for example, a slope and offset of the line 504 fitting the data set.

Next, the current mass flow rate 422 of the contaminate particles may be determined from the slope of the line 504 fitting the data set. In the example shown, this is determined in four steps. First, by calculating (714) the oldest and newest weight in the sliding window of time 502 from the slope and the offset. Second, by subtracting (716) the newest weight from the oldest weight in order to obtain the delta weight. Third, by subtracting (718) the oldest time from the newest time in the sliding window of time 502 in order to obtain the delta time. Fourth, the current mass flow rate 422 is obtained by dividing (720) the delta weight by the delta time.

Operations may end by outputting (722) the current mass flow rate 422. For example, outputting (722) the current mass flow rate 422 may include the delivery flow rate logic returning the current mass flow rate 422 as a return value of a subroutine. As another example, outputting (722) the current mass flow rate 422 may include the delivery flow rate logic setting the current mass flow rate 422 in the memory 144. Alternatively, operations may end by, for example, looping back to the start of the delivery flow rate logic after outputting (722) the current mass flow rate 422.

Figure 8:
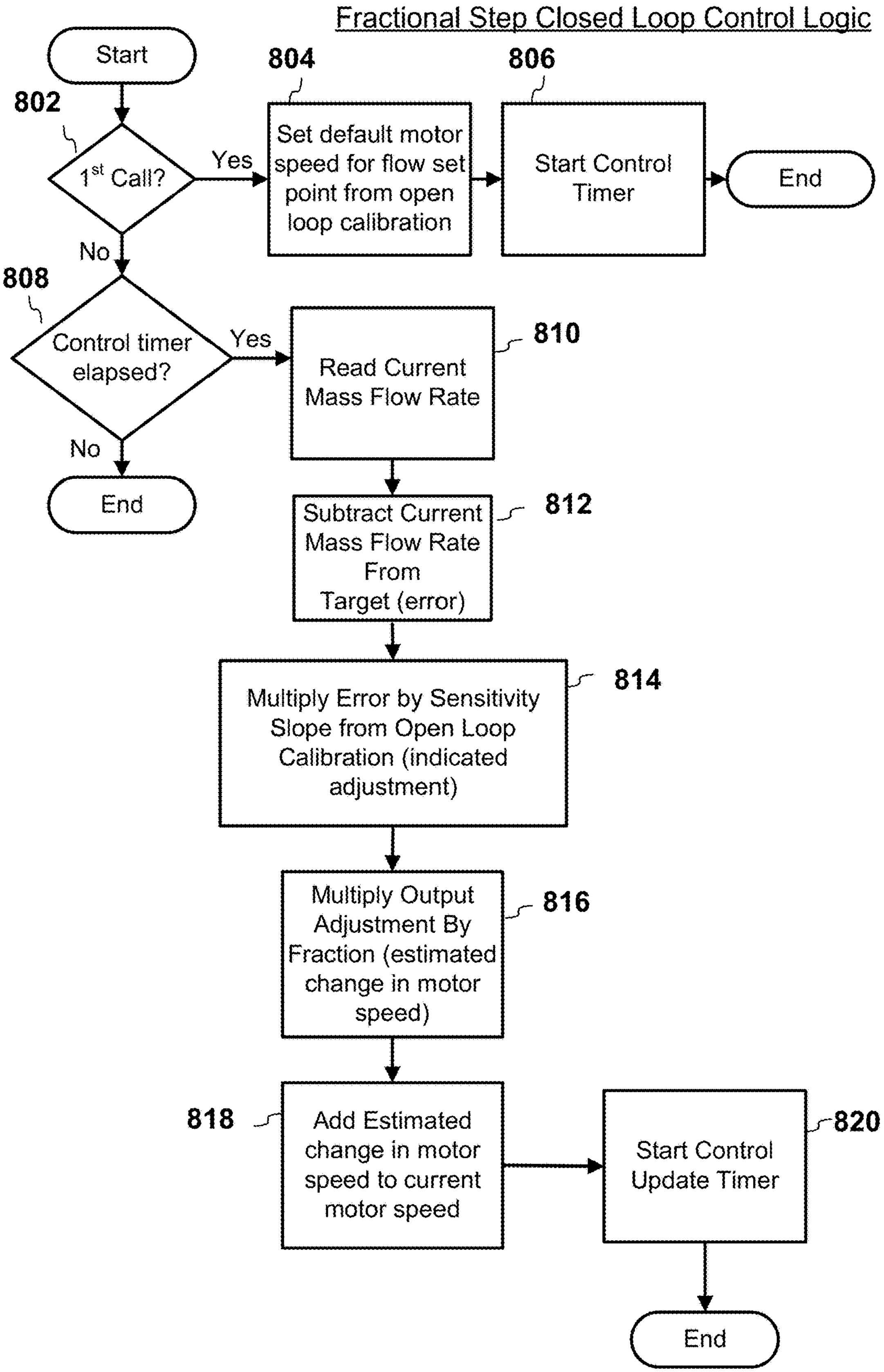
FIG. 8 illustrates a flow diagram of an example of fractional step closed loop control logic.

FIG. 8 illustrates a flow diagram of an example of the fractional step closed loop control logic. The fractional step closed loop control logic may be invoked, for example, each time the delivery flow rate logic is invoked. In the illustrated example, the system 400 utilizes the control timer 414 to indicate when to determine the estimated change 602 in the motor speed 416 and to cause the estimated change 602 in the motor speed 416.

Operations may begin by determining (802) if the fractional step closed loop control logic is being called for the first time after the conveyor 222 is powered up. If it is the first time, then the motor speed 416 may be set (804) to a default motor speed, and the control timer 414 may be started (806). The control timer 414 may be set to at least the duration of the sliding window of time 502. The default motor speed may be the speed corresponding to the target mass flow rate 418 as indicated by the predetermined mapping 408 of the flow rates to motor speeds. Alternatively, the default motor speed may be the last known speed 420. The last known speed 420 is the last motor speed used for the target mass flow rate 418. The last know speed 420 may be useful when the motor 404 is stopped and started again within a relatively short time period. Such stops and starts are typical during the operation of the contamination test rigs 100 described herein. After starting (806) the control timer 414 and setting (804) the motor speed 416, operations may end.

Alternatively, if it is not the first time that the fractional step closed loop control logic is called after the conveyor 222 is powered up, then operations may continue to determine if the control timer 414 has elapsed. If the control timer 414 has not elapsed, then the buffer 410 is still being populated with the time points and weight measurements in the sliding window of time 502, so operations may end.

Alternatively, if the control timer 414 has elapsed, then the buffer 410 has been populated with the time points and weight measurements in the sliding window of time 502. Accordingly, operations may proceed to read (810) the current mass flow rate 422. For example, the variable for the current mass flow rate 422 may be read. Alternately, or in addition, the current mass flow rate 422 may be determined as described further above.

After the current mass flow rate 422 is read (810), the flow rate error 608 may be calculated as the target mass flow rate 418 minus the current mass flow rate 422. The indicated motor speed adjustment 606 is calculated (814) as the sensitivity slope 610 multiplied by the flow rate error 608. The estimated change 602 in motor speed is calculated (816) by multiplying the indicated motor speed adjustment 606 by the fraction described further above. Finally, the motor speed 416 is calculated (818) as the estimated change 602 in motor speed plus the current value of the motor speed 416, and the speed of the motor 404 is adjusted to the newly calculated motor speed 416.

Operations may end by, for example, starting the control timer 414.

Figure 9:
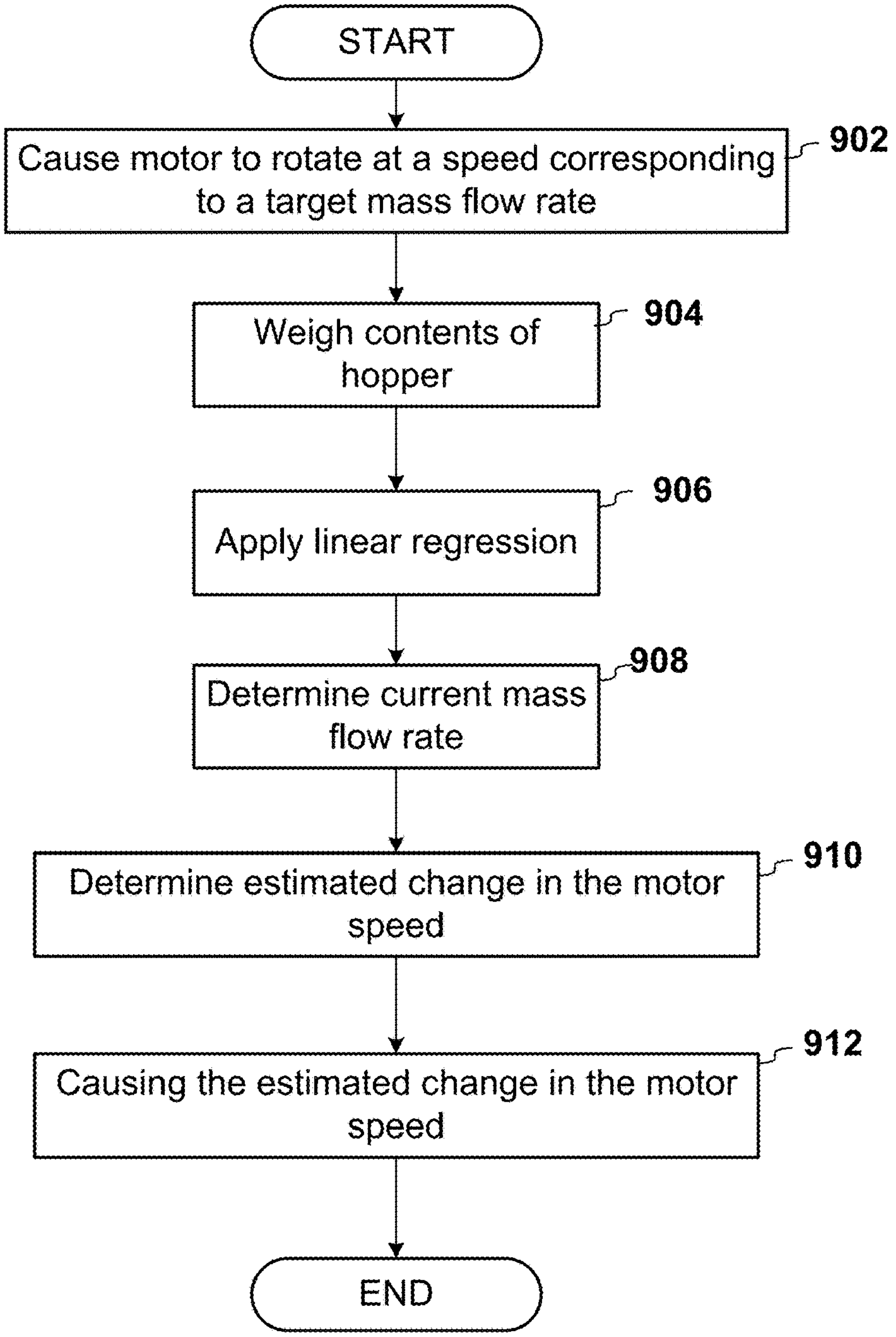
FIG. 9 illustrates a flow diagram of an example of a method of controlling delivery of contaminates.

FIG. 9 illustrates a flow diagram of an example of a method of controlling delivery of contaminates. Operations may begin by causing (902) the motor 404, which drives the conveyor 222, to rotate at the motor speed 416 corresponding to the target mass flow rate 418.

Next, contents of the hopper 204 are weighed (904) at multiple time points within the sliding window of time 502 by taking weight measurements with the scale 206.

The processor 142 applies (906) linear regression to a data set comprising the time points as an independent variable and the weight measurements as a dependent variable. The application of linear regression results in a determination of the line 504 fitting the data set.

The processor 142 determines (908) the current mass flow rate 422 of the contaminate particles from the slope of the line 504 fitting the data set.

The processor 142 determines (910) the estimated change 602 in the motor speed 416 needed to achieve the target mass flow rate 418. The estimated change 602 is determined from the predetermined mapping 408 of flow rates to motor speeds and is based on the current mass flow rate 422 and the target mass flow rate 418, the estimated change 602 is determined to be a fraction of the motor speed adjustment 606 that the predetermined mapping of flow rates to motor speeds indicates from only the current mass flow rate and the target mass flow rate.

Operations may end by the processor 142 causing (912) the estimated change 602 in the motor speed 416. In an alternative example, operations may continue at the operation of weighing (904) the contents of the hopper 204 at multiple time points within the sliding window of time 502.

The flow diagrams described herein may include more, fewer, or different operations than illustrated. The system 400 for controlling delivery of contaminates may include more, fewer, or different components than illustrated. Each component may include additional, different, or fewer components than illustrated.

The system 400 may be implemented in many different ways. Each module, such as the linear regression module or the control timer 414, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 144, for example, that comprises instructions executable with the processor 142 or other processor to implement one or more of the features of the module. When any one of the module includes the portion of the memory that comprises instructions executable with the processor, the module may or may not include the processor. In some examples, each module may just be the portion of the memory 144 or other physical memory that comprises instructions executable with the processor 142 or other processor to implement the features of the corresponding module without the module including any other hardware. Because each module includes at least some hardware even when the included hardware comprises software, each module may be interchangeably referred to as a hardware module, such as the linear regression hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 400 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>", or "at least one of <A>, <B>, . . . or <N>", or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of controlling delivery of contaminates, the method comprising: causing a motor, which drives a conveyor, to rotate at a motor speed, wherein the conveyor moves a plurality of contaminate particles from a hopper into an airflow, the motor speed corresponding to a target mass flow rate; weighing contents of the hopper at a plurality of time points within a sliding window of time by taking a plurality of weight measurements with a scale; applying linear regression, by a processor, to a data set comprising the time points as an independent variable and the weight measurements as a dependent variable, which results in a determination of a line fitting the data set; determining, by the processor, a current mass flow rate of the contaminate particles from the slope of the line fitting the data set; determining, by the processor, an estimated change in the motor speed needed to achieve the target mass flow rate, the estimated change determined from a predetermined mapping of flow rates to motor speeds, the estimated change based on the current mass flow rate and the target mass flow rate, wherein the estimated change is determined to be a fraction of a motor speed adjustment that the predetermined mapping of flow rates to motor speeds indicates from only the current mass flow rate and the target mass flow rate; and causing, by the processor, the estimated change in the motor speed.

A second aspect relates to a method of any preceding aspect, wherein determining the estimated change in the motor speed further comprises: determining a flow rate error as a difference between the current mass flow rate and a target mass flow rate; calculating a sensitivity slope as a change in motor speed divided by a change in flow rate at the current mass flow rate from the predetermined mapping of flow rates to motor speeds; and calculating the estimated change in the motor speed to be the product of: the sensitivity slope, the flow rate error, and the fraction.

A third aspect relates to a method of any preceding aspect, wherein determining the estimated change in the motor speed further comprises: determining a first motor speed corresponding to the current mass flow rate from the predetermined mapping; determining a second motor speed corresponding to the target mass flow rate from the predetermined mapping; calculating the indicated motor speed adjustment to be the second motor speed minus the first motor speed; and calculating the estimated change in the motor speed to be the fraction multiplied by the indicated motor speed adjustment.

A fourth aspect relates to a method of any preceding aspect, further comprising selecting the motor speed to be a last known speed for the target mass flow rate when starting the motor.

A fifth aspect relates to a method of any preceding aspect, further comprising selecting the motor speed corresponding to the target mass flow rate from the predetermined mapping of flow rates to motor speeds when starting the motor.

A sixth aspect relates to a method of any preceding aspect, wherein the airflow is in a mix line of a test rig for testing a test valve.

A seventh aspect relates to a method of any preceding aspect, further comprising storing the data set comprising the time points and the weight measurements in a FIFO buffer.

An eighth aspect relates to a method of any preceding aspect, wherein the fraction is in a range of 0.3 to 0.8.

A ninth aspect relates to a method of any preceding aspect, wherein target mass flow rate is in a range of 0.01 to 0.0001 pounds per minute.

A tenth aspect relates to a method of any preceding aspect, wherein sliding window of time is a duration in a range of 2 to 4 minutes.

An eleventh aspect relates to a system for controlling delivery of contaminates, the system comprising: a conveyor configured to feed a plurality of contaminate particles from a hopper towards an airflow, the conveyor including a motor configured to drive the conveyor; a scale configured to measure the weight of contents of the hopper; a processor in communication with the motor and the scale, the processor configured to: cause the motor to rotate at a motor speed corresponding to a target mass flow rate; receive a plurality of weight measurements from the scale taken within a sliding window of time, each of the weight measurements having a corresponding one of a plurality of time points indicative of when the weight measurements were taken; apply linear regression to a data set comprising the time points as an independent variable and the weight measurements as a dependent variable, which results in a determination of a line fitting the data set; determine a current mass flow rate of the contaminate particles from the slope of the line fitting the data set; determine an estimated change in the motor speed needed to achieve the target mass flow rate, the estimated change determined from a predetermined mapping of flow rates to motor speeds, the estimated change based on the current mass flow rate and the target mass flow rate, wherein the estimated change is determined to be a fraction of a motor speed adjustment that the predetermined mapping of flow rates to motor speeds indicates from only the current mass flow rate and the target mass flow rate; and cause the estimated change in the motor speed.

A twelfth aspect relates to a system of any previous aspect, wherein the processor is configured to determine the estimated change in the motor speed by: determining a flow rate error as a difference between the current mass flow rate and the target mass flow rate; calculating a sensitivity slope as a change in motor speed divided by a change in flow rate at the current mass flow rate from the predetermined mapping of flow rates to motor speeds; and calculating the estimated change in the motor speed to be the sensitivity slope multiplied by the flow rate error multiplied by the fraction.

A thirteenth aspect relates to a system of any previous aspect, wherein the processor is configured to determine the estimated change in the motor speed by: determining a first motor speed corresponding to the current mass flow rate from the predetermined mapping; determining a second motor speed corresponding to the target mass flow rate from the predetermined mapping; calculating the indicated motor speed adjustment to be the second motor speed minus the first motor speed; calculating the estimated change in the motor speed to be the fraction multiplied by the indicated motor speed adjustment.

A fourteenth aspect relates to a system of any previous aspect, wherein the processor is configured to set the motor speed to a last known speed for the target mass flow rate in response to a startup of the motor.

A fifteenth aspect relates to a system of any previous aspect, wherein the processor is configured to set the motor speed to the target mass flow rate from the predetermined mapping of flow rates to motor speeds in response to a startup of the motor.

A sixteenth aspect relates to a system of any previous aspect, wherein the airflow is in a mix line of a test rig for testing a test valve.

A seventeenth aspect relates to a system of any previous aspect, wherein the fraction is in a range of 0.4 to 0.7.

An eighteenth aspect relates to a system of any previous aspect, wherein the target mass flow rate is in a range of 0.01 to 0.0001 pounds per minute.

A nineteenth aspect relates to a system of any previous aspect, wherein the sliding window of time is a duration in a range of 2 to 4 minutes.

A twentieth aspect relates to a method of controlling delivery of contaminates, the method comprising: determining a motor speed corresponding to a target mass flow rate from a predetermined mapping of flow rates to motor speeds; causing a motor, which drives a conveyor, to rotate at the motor speed, wherein the conveyor feeds contaminate particles from a hopper to an airflow in a mix line of a test rig for testing a test valve; weighing contents of the hopper at a plurality of time points within a sliding window of time by taking a plurality of weight measurements with a scale; determining a line that fits a data set by a processor applying linear regression to the data set, the data set comprising the time points as an independent variable and the weight measurements as a dependent variable; determining, by the processor, a current mass flow rate of the contaminate particles from the slope of the line fitting the data set; determining, by the processor, an estimated change in the motor speed by: determining a flow rate error as a difference between the current mass flow rate and a target mass flow rate; calculating a sensitivity slope as a change in motor speed divided by a change in flow rate at the current mass flow rate from the predetermined mapping of flow rates to motor speeds at the current mass flow rate; and calculating the estimated change in the motor speed to be the sensitivity slope multiplied by the flow rate error multiplied by a predetermined fraction; and causing, by the processor, the estimated change in the motor speed.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of controlling delivery of contaminates, the method comprising:

causing a motor, which drives a conveyor, to rotate at a motor speed, wherein the conveyor moves a plurality of contaminate particles from a hopper into an airflow, the motor speed corresponding to a target mass flow rate;

weighing contents of the hopper at a plurality of time points within a sliding window of time by taking a plurality of weight measurements with a scale;

applying linear regression, by a processor, to a data set comprising the time points as an independent variable and the weight measurements as a dependent variable, which results in a determination of a line fitting the data set, determining, by the processor, a current mass flow rate of the contaminate particles from the slope of the line fitting the data set;

determining, by the processor, an estimated change in the motor speed needed to achieve the target mass flow rate, the estimated change determined from a predetermined mapping of flow rates to motor speeds, the estimated change based on the current mass flow rate and the target mass flow rate, wherein the estimated change is determined to be a fraction of a motor speed adjustment that the predetermined mapping of flow rates to motor speeds indicates from only the current mass flow rate and the target mass flow rate; and causing, by the processor, a change in the motor speed of the motor in accordance with the estimated change in the motor speed.

2. The method of claim 1, wherein determining the estimated change in the motor speed further comprises: determining a flow rate error as a difference between the current mass flow rate and a target mass flow rate; calculating a sensitivity slope as a change in motor speed divided by a change in flow rate at the current mass flow rate from the predetermined mapping of flow rates to motor speeds; and calculating the estimated change in the motor speed to be the product of: the sensitivity slope, the flow rate error, and the fraction.

3. The method of claim 1, wherein determining the estimated change in the motor speed further comprises: determining a first motor speed corresponding to the current mass flow rate from the predetermined mapping; determining a second motor speed corresponding to the target mass flow rate from the predetermined mapping; calculating the indicated motor speed adjustment to be the second motor speed minus the first motor speed; and calculating the estimated change in the motor speed to be the fraction multiplied by the indicated motor speed adjustment.

4. The method of claim 1, further comprising selecting the motor speed to be a last known speed for the target mass flow rate when starting the motor.

5. The method of claim 1, further comprising selecting the motor speed corresponding to the target mass flow rate from the predetermined mapping of flow rates to motor speeds when starting the motor.

6. The method of claim 1, wherein the airflow is in a mix line of a test rig for testing a test valve.

7. The method of claim 1, further comprising storing the data set comprising the time points and the weight measurements in a FIFO buffer.

8. The method of claim 1, wherein the fraction is in a range of 0.3 to 0.8.

9. The method of claim 1, wherein target mass flow rate is in a range of 0.01 to 0.0001 pounds per minute.

10. The method of claim 1, wherein sliding window of time is a duration in a range of 2 to 4 minutes.

11. A system for controlling delivery of contaminates, the system comprising:

a conveyor configured to feed a plurality of contaminate particles from a hopper towards an airflow, the conveyor including a motor configured to drive the conveyor;

a scale configured to measure the weight of contents of the hopper;

a processor in communication with the motor and the scale, the processor configured to:

cause the motor to rotate at a motor speed corresponding to a target mass flow rate;

receive a plurality of weight measurements from the scale taken within a sliding window of time, each of the weight measurements having a corresponding one of a plurality of time points indicative of when the weight measurements were taken;

apply linear regression to a data set comprising the time points as an independent variable and the weight measurements as a dependent variable, which results in a determination of a line fitting the data set;

determine a current mass flow rate of the contaminate particles from the slope of the line fitting the data set;

determine an estimated change in the motor speed needed to achieve the target mass flow rate, the estimated change determined from a predetermined mapping of flow rates to motor speeds, the estimated change based on the current mass flow rate and the target mass flow rate, wherein the estimated change is determined to be a fraction of a motor speed adjustment that the predetermined mapping of flow rates to motor speeds indicates from only the current mass flow rate and the target mass flow rate; and cause a change in the motor speed of the motor in accordance with the estimated change in the motor speed.

12. The system of claim 11, wherein the processor is configured to determine the estimated change in the motor speed by: determining a flow rate error as a difference between the current mass flow rate and the target mass flow rate; calculating a sensitivity slope as a change in motor speed divided by a change in flow rate at the current mass flow rate from the predetermined mapping of flow rates to motor speeds; and calculating the estimated change in the motor speed to be the sensitivity slope multiplied by the flow rate error multiplied by the fraction.

13. The system of claim 11, wherein the processor is configured to determine the estimated change in the motor speed by: determining a first motor speed corresponding to the current mass flow rate from the predetermined mapping; determining a second motor speed corresponding to the target mass flow rate from the predetermined mapping; calculating the indicated motor speed adjustment to be the second motor speed minus the first motor speed; calculating the estimated change in the motor speed to be the fraction multiplied by the indicated motor speed adjustment.

14. The system of claim 11, wherein the processor is configured to set the motor speed to a last known speed for the target mass flow rate in response to a startup of the motor.

15. The system of claim 11, wherein the processor is configured to set the motor speed to the target mass flow rate from the predetermined mapping of flow rates to motor speeds in response to a startup of the motor.

16. The system of claim 11, wherein the airflow is in a mix line of a test rig for testing a test valve.

17. The system of claim 11, wherein the fraction is in a range of 0.4 to 0.7.

18. The system of claim 11, wherein the target mass flow rate is in a range of 0.01 to 0.0001 pounds per minute.

19. The system of claim 11, wherein the sliding window of time is a duration in a range of 2 to 4 minutes.

20. A method of controlling delivery of contaminates, the method comprising:

determining a motor speed corresponding to a target mass flow rate from a predetermined mapping of flow rates to motor speeds;

causing a motor, which drives a conveyor, to rotate at the motor speed, wherein the conveyor feeds contaminate particles from a hopper to an airflow in a mix line of a test rig for testing a test valve;

weighing contents of the hopper at a plurality of time points within a sliding window of time by taking a plurality of weight measurements with a scale;

determining a line that fits a data set by a processor applying linear regression to the data set, the data set comprising the time points as an independent variable and the weight measurements as a dependent variable;

determining, by the processor, a current mass flow rate of the contaminate particles from the slope of the line fitting the data set; determining, by the processor, an estimated change in the motor speed by:

determining a flow rate error as a difference between the current mass flow rate and a target mass flow rate;

calculating a sensitivity slope as a change in motor speed divided by a change in flow rate at the current mass flow rate from the predetermined mapping of flow rates to motor speeds at the current mass flow rate; and calculating the estimated change in the motor speed to be the sensitivity slope multiplied by the flow rate error multiplied by a predetermined fraction; and causing, by the processor, a change in the motor speed of the motor in accordance with the estimated change in the motor speed.

* * * * *